United States Patent
Sampath

(10) Patent No.: US 7,940,687 B2
(45) Date of Patent: May 10, 2011

(54) EFFICIENT PARTITIONING OF CONTROL AND DATA FIELDS

(75) Inventor: Ashwin Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 857 days.

(21) Appl. No.: 11/449,218

(22) Filed: Jun. 7, 2006

(65) Prior Publication Data

US 2007/0109988 A1    May 17, 2007

Related U.S. Application Data

(60) Provisional application No. 60/737,688, filed on Nov. 16, 2005.

(51) Int. Cl.
*H04J 3/14* (2006.01)
(52) U.S. Cl. ........................................ 370/252
(58) Field of Classification Search .............. 370/442, 370/329, 347, 349; 455/522
See application file for complete search history.

(56) References Cited

U.S. PATENT DOCUMENTS

| | | | |
|---|---|---|---|
| 2002/0154610 A1 * | 10/2002 | Tiedemann et al. | 370/329 |
| 2003/0142656 A1 * | 7/2003 | Padovani et al. | 370/347 |
| 2003/0185159 A1 | 10/2003 | Seo | |
| 2004/0038697 A1 * | 2/2004 | Attar et al. | 455/522 |
| 2004/0078822 A1 | 4/2004 | Breen | |
| 2004/0190485 A1 * | 9/2004 | Khan | 370/349 |
| 2004/0240465 A1 | 12/2004 | Newberg | |
| 2005/0122231 A1 * | 6/2005 | Varaiya et al. | 340/870.01 |

FOREIGN PATENT DOCUMENTS

| | | |
|---|---|---|
| DE | 10021820 | 11/2001 |
| TW | 496058 | 7/2002 |
| TW | 221968 | 10/2004 |
| TW | 223962 | 11/2004 |
| WO | WO2004019649 | 3/2004 |

OTHER PUBLICATIONS

International Search Report, PCT/US2006/025932, International Search Authority, European Patent Office, Oct. 6, 2006.
Taiwan Search Report—Application No. 095124751 International Search Authority—Taiwan Patent Office—Mar. 19, 2009.

* cited by examiner

*Primary Examiner* — Albert T Chou
(74) *Attorney, Agent, or Firm* — Dang M. Vo

(57) ABSTRACT

Embodiments describe efficient tradeoff of latencies with processing times. A single control field can be placed within a frame to tradeoff encoding time with decoding time. Alternatively, a control field can be split into two portions to achieve good latency performance while maintaining sufficient processing time for scheduling, encoding and decoding. In accordance with some embodiments, a ACK/NACK field on one hop can serve the dual purpose of being a request for resources on the next hop in a multi-hop system. Also described is implicit acknowledgment monitoring that can improve latency performance.

21 Claims, 13 Drawing Sheets

EFFICIENT PARTITIONING OF CONTROL AND DATA FIELDS

CROSS-REFERENCE TO RELATED APPLICATIONS

This application claims the benefit of U.S. Provisional Application Ser. No. 60/737,688, filed Nov. 16, 2005, entitled "PARTITIONING OF CONTROL AND DATA FIELDS," the entirety of which is incorporated herein by reference.

BACKGROUND

I. Field

The following description relates generally to communication systems and, amongst other things, to communication in a multi-hop wireless network.

II. Background

Wireless communication networks are utilized to communicate information regardless of where a user may be located (e.g., inside or outside) and regardless of whether the user is mobile or stationary. Generally, wireless communication networks are established through a mobile device communicating with a base station or access point. The access point covers a geographic range or cell and, as a mobile device is operated, the mobile device may be moved in and out of these geographic cells. To achieve virtually uninterrupted communication, the mobile device is assigned resources of the cell it has entered and is de-assigned resources of the cell it has exited.

In a multi-hop topology, a communication or transmission is transferred through a number of wireless hops or segments to an access point with a wired connection to a public (e.g., Internet) or private network. Overall latency is one of several issues that should be considered for the entire communication path (e.g., from a source to a destination), not just during an immediate hop. A control field placed in a single location at the start of a slot may increase delays when the control field is used to request and/or grant resources and to acknowledge transmissions. This problem can be accentuated when used in multi-hop wireless networks.

SUMMARY

The following presents a simplified summary in order to provide a basic understanding of some aspects of the disclosed embodiments. This summary is not an extensive overview and is intended to neither identify key or critical elements nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with partitioning of control and data fields within a frame. Proper partitioning of control and data fields within a frame is important to ensure minimum latency in data transmission while allowing sufficient processing time.

According to an embodiment, a method for data communication is provided. The method includes determining a time division between an encoding time and a decoding time and selectively placing a control field within a frame of a data transmission based in part on the determined time division. In accordance with some embodiments the method further includes placing the control field right of a slot center if the decoding time needed is longer than the encoding time or placing the control field left of the slot center if the decoding time needed is shorter than the encoding time. In addition or alternatively to encoding at the transmitter and decoding at the receiver, another aspect of processing is the time available for the scheduler to determine which transmitter should be granted resources and how many resources should be granted. A split control field approach provides additional flexibility in allowing as much time for scheduling as possible without increasing the frame or slot duration.

In accordance with some embodiments, an apparatus for data communication is provided. The apparatus can include a time partition module that determines a time partition between an encoding time and a decoding time. Also included in the apparatus can be a slot placement module that determines placement of the control field within a frame. In some embodiments, the apparatus can also include an implicit request monitor that monitors an ACK/NACK field from a sending node and considers the ACK/NACK field as a request for resources.

Some embodiments include a computer readable medium embodying a method for data communication. The method includes establishing a partition of time between an encoding time and a decoding time and placing at least a portion of the control field at a selective location of a data frame to achieve the established time partition between the encoding time and the decoding time.

In accordance with some embodiments is a processor that executes instructions for data communication. The processor can be configured to select a time division between an encoding time and a decoding time and place a control field within a frame of a data transmission based in part on the selected time division.

In accordance with some embodiments is an apparatus that includes a means for ascertaining an encoding time and a decoding time division and a means for locating a control field within a frame based in part on the ascertained division between the encoding time and the decoding time. The apparatus can also include a means for dividing the control field into two portions, a means for selectively including an anticipatory request, and a means for decoding an ACK and using the ACK as an implicit request for resources.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
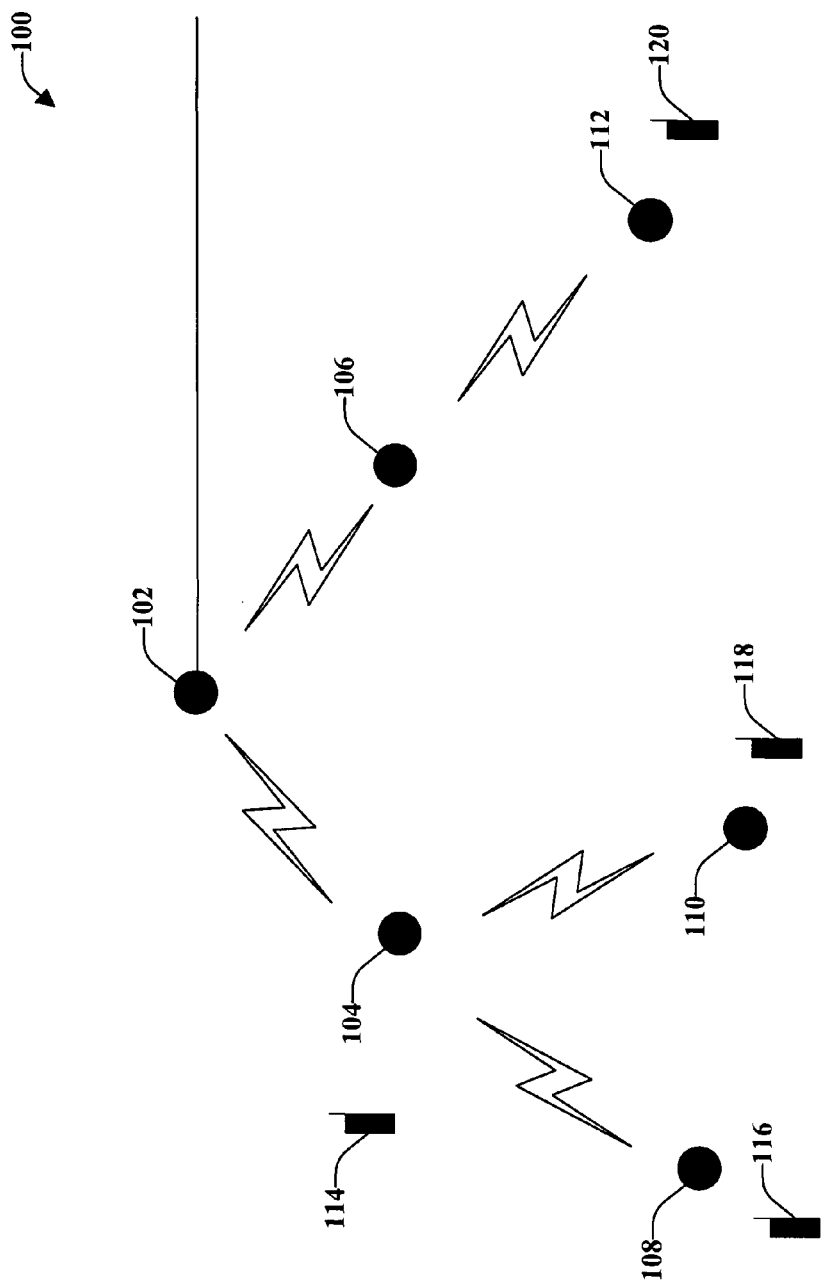
FIG. 1 is a representation of a multi-hop communication system in accordance with the various embodiments disclosed herein.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, wireless terminal, handset, host, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

In the following detailed description, various aspects and embodiments may be described in the context of Time Division Duplex (TDD). While these inventive aspects may be well suited for use with the disclosed embodiments, those skilled in the art will readily appreciate that these inventive aspects are likewise applicable for use in various other systems. Accordingly, any reference to TDD is intended only to illustrate the inventive aspects, with the understanding that such inventive aspects have a wide range of applications.

With reference now to the drawings, FIG. 1 is a representation of a multi-hop communication system 100 in accordance with the various embodiments disclosed herein. Access point nodes 102, 104, 106, 108, 110, and 112 are connected (e.g., wirelessly) in a tree like configuration. As illustrated, access point 102 may be the only wired access point and may be wired to the Internet, for example. However, any or all of the other access points 104-112 may be wired. Access terminals 114, 116, 118, and 120 communicate with wired access node 102 through multiple hops (e.g., access nodes 104-112), if necessary. A forward link is established when wired access node 102 initiates communication intended for an access terminal 114-120. A reverse link is established when one or more access terminals 114-120 initiate a communication intended for wired access point 102. It should be understood that a multi-hop wireless network could have more or fewer hops than those shown and described and that different access terminals may have a different number of hops.

In the following detailed description, a TDD system will be described wherein a receiver schedules data transmission based on receiving requests from a transmitter. For ease of explanation, it should be assumed that a node could not transmit and receive at the same time. In addition, for explanation purposes, a coloring scheme or strategy will be discussed wherein alternate nodes are colored differently and time is divided into colored time slots. A node transmits on a time slot corresponding to its color and listens during time slots of other colors. It should be understood that a variety of other strategies can be utilized to distinguish alternate nodes and that color is merely utilized herein for simplicity purposes.

Utilizing a two-color strategy, access nodes 104 and 106 and terminals 116, 118, and 120 are one color, for example green. Wired access node 102, access nodes 108, 110, and 112, and terminal 114 are a second color such as, for example, red. Thus, there are no connected nodes in the tree that are represented by the same color in this scheme.

In a receiver-based scheduling system, transmission should be permitted only between opposite colors. In this setup, the nodes are synchronized and time slots are of fixed duration, alternating between the two colors. Each time slot can be broken up into control and data portions. In a time slot corresponding to its color, the transmitter sends a request to the receiver asking for resources. In a subsequent time slot of the opposite color, the receiver determines which user(s) should transmit and on what resources (this task is typically referred to as scheduling). In the next time slot, transmitters that received a GRANT send data to the receiver that in turn will send an acknowledgment (ACK) or a negative-acknowledgment (NACK) to the transmitter, depending on whether such receiver was able to decode the data correctly or not. In this embodiment, it is assumed that a physical layer packet can only proceed to the next hop after it has been successfully decoded on the current hop.

Data transmission within system 100 can be configured to allow selective partitioning of control and data fields within a frame. Such partitioning can provide reduced latency in data transmissions while allowing sufficient processing time for the data transmissions. The selective partitioning can also provide a tradeoff between latency in data transmission with processing time depending on the parameters associated with the data transmission. Such parameters can include an available scheduling time, an available decoding time, an available packet preparation time (also referred to as encoding time), and/or delays to be managed such as first transmit end to retransmit start (if the packet is not acknowledged (NACK)), hop delay, which is transmit end to next hop transmit start, or needed interlaces/HARQ channel (added complexity in processing and signaling with increasing interlaces).

Figure 2:
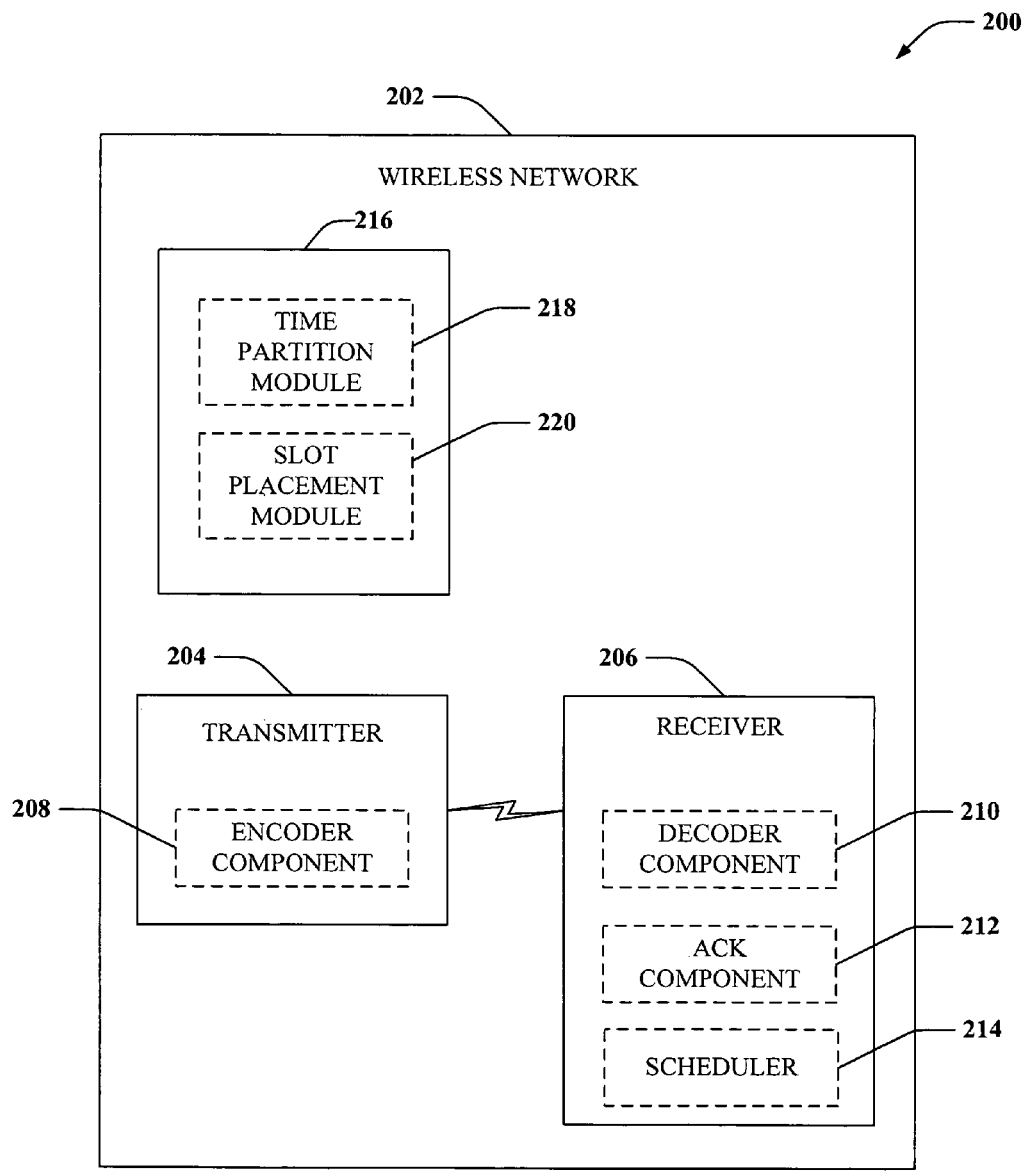
FIG. 2 illustrates a system for communicating information in a multi-hop communication system.

FIG. 2 illustrates a system 200 for communicating information in a multi-hop communication system. System 200 comprises a wireless network 202, similar to wireless system 100 described above, that includes a transmitter 204 and receiver 206. Although a number of transmitter(s) 204 and receiver(s) 206 can be included in wireless network 202, as will be appreciated, a single transmitter 204 that transmits communication data signals to a single receiver 206 is illustrated for purposes of simplicity. Transmitter 204 includes an encoder component 208 that can modulate and/or encode a data transmission in accordance with a suitable wireless communication protocol (e.g., OFDM, OFDMA, CDMA, TDMA, GSM, HSDPA, . . . ), which signals can then be transmitted to receiver 206. Encoder component 208 can be a channel encoder that follows a source encoder, for example. The channel encoder can be based on schemes such as a convolutional, Turbo or Low-Density Parity Check (LDPC) encoding.

Receiver 206 includes a decoder component 210 that can decode a received data transmission. Upon successful decode of the data transmission, an acknowledgment (ACK) component 212 can generate an acknowledgment that indicates successful decode of the data transmission, which can be sent to transmitter 204 to inform transmitter 204 that the data transmission was received and decoded, and therefore need not be retransmitted. ACK component 212 can employ an acknowledgment technique in conjunction with an ACK/NACK protocol.

Acknowledgment component 212 can further transmit a negative acknowledgment (NACK) if there was not a successful decode of the data transmission. The NACK can be sent to the transmitter 204 to inform transmitter 204 that the data transmission was not received and/or not successfully decoded by receiver 206. Thus, transmitter 204 can retransmit the data transmission, or a portion thereof, if further communication of such data is to be transmitted.

Also included in receiver 206 is a scheduler 214 that can be configured to determine an optimal scheduling for the data transmission. Thus, the major processing times or delays (e.g., encoding, decoding, and scheduling) can be performed by separate components. However, in accordance with some embodiments, one or more processing times are determined by the same component, thus, three separate components are not utilized in accordance with these embodiments.

In accordance with some embodiments, receiver 206 can send the data transmission to a next receiver (not shown) following a similar process. This process can be repeated through any number of hops until the data transmission reaches the intended recipient.

For example, Node A may want to send a communication to Node B to be forwarded to Node C. If so, Node B generally might not request a transmission to Node C before Node B determines whether it has successfully received Node A's packet. However, in some situations, to reduce delay and, in particular, if it is known with high probability that Node B will decode Node A's packet successfully, Node B can send a request to Node C before completing the decoding of the packet from Node A, which is referred to as an anticipatory request. However, it should be understood that anticipatory requests could result in wasted resources. Such wasted resources can occur, for example, if Node C grants resources to Node B but Node B fails to successfully decode the packet from Node A.

Therefore, in accordance with some embodiments, receiver 206 can listen for ACKs being sent out from a preceding terminal to avoid anticipatory requests if a split placement control field is utilized. For example, transmitter 204 may have received data from another terminal (not shown), wherein such data is intended to be sent to receiver 206. Transmitter 204 should request resources from the other terminal (not shown) to send to receiver 206 only after transmitter 204 has successfully decoded the transmission from the other terminal (not shown). However, if receiver 206 listens for ACKs that transmitter 204 sends to the other terminal (not shown), then receiver 206 can implicitly use the ACK to infer a request for resources by transmitter 204.

To make a determination as to an appropriate placement and/or partitioning of a control field, an off-line design task can take into account various criteria. The off-line task can be performed by one or more design modules 216 within the network that use the information to decide the appropriate placement and/or partitioning. For example, how the slot time is divided between encoding time and decoding time can be taken into consideration. Other criteria include mitigation of anticipatory requests, lower retransmission delay, etc.

Examples of control field parameters for different schemes can include a frame having a duration of two milliseconds. A control duration can be 0.2 milliseconds and a guard period can be 0.01 milliseconds. For a single location placement, the starting point can be 0.75 fraction of slot length. For a split field with a REQ/PILOT field, the starting point can be at the start of slot. For example, the PILOT can be sent by the transmitter and could be used by the receiver to make an appropriate GRANT based on the PILOT quality. For a split field with a GRANT/ACK field, the starting point can be 0.75 fraction of slot length.

Note that in the below table are examples of associated processing times and delays for different schemes. The processing times and delays are in microseconds. "Front" refers to single placement of the control field at the front of the slot. "Center" refers to single placement location of the control field at the middle of the slot. "Split" refers to split placement of the control field and "Single Loc/Off Center" refers to single location placement. It should be understood that these times are for illustration purposes and the disclosed embodiments are not limited to the times noted in the below figure as many other times can be utilized.

TABLE 1

| | Anticipatory REQ/Auto Grant | | | |
|---|---|---|---|---|
| | Front | Center | Split | Single Location/OffCenter |
| Scheduling Time Available | 1.81 | 1.81 | 3.31 | 1.81 |
| "Decoding" Time Available | 4.23 | 0.91 | 1.51 | 1.51 |
| "Encoding" Time Available | 2.01 | 0.91 | 0.31 | 0.31 |
| First Tx End to Retx Start | 6.24 | 2.02 | 2.02 | 2.02 |
| Hop Delay: Tx End to Next Hop Tx Start | 4.23 | 4.03 | 4.03 | 4.03 |
| Interlaces/HARQ Ch Needed | 2 | 1 | 1 | 1 |

With reference to Table 1, the sum of the processing times between encoding and decoding is the same for the split placement and the single location/off center placement. Depending on the location, the division between the encoding time and the decoding time can change for both designs. Thus, the division can be split unequally between encoding and decoding, unlike the center placement. Typically decoding times are longer than encoding times, thus the split placement and the single location/off center placement offer advantages over the center placement because the times can be adjusted appropriately.

One or more off-line design tasks or modules 216 can include a time partition module 218 that can be configured to optimize an encoding time/decoding time within a slot. For example, in some circumstances a decoding time should be longer than an encoding time while in other circumstances there should be a longer encoding time. Time partition module 218 can determine the best portion of each slot to place the control field.

In addition, a slot placement module 220 associated with the one or more off-line design tasks or modules 216 can be configured to place the control field in the optimal location within the slot to achieve a desirable encoding time/decoding time tradeoff. In accordance with some embodiments, slot placement module 220 can also be configured to partition a control field into two portions and place each portion at a different location within the slot. For example, the single control field can be placed to the right of slot center if a decoding time should be longer than an encoding time. If the encoding time should be longer than the decoding time, slot placement module can place the control field to the left of the slot center.

The combined length of the two portions should be approximately the length of one slot. A REQUEST and a PILOT can be placed in one portion of the divided control field and a GRANT and an ACK/NACK can be placed in the other portion of the divided control field, such placement can be performed by the time partition module 220, for example.

Figure 3:
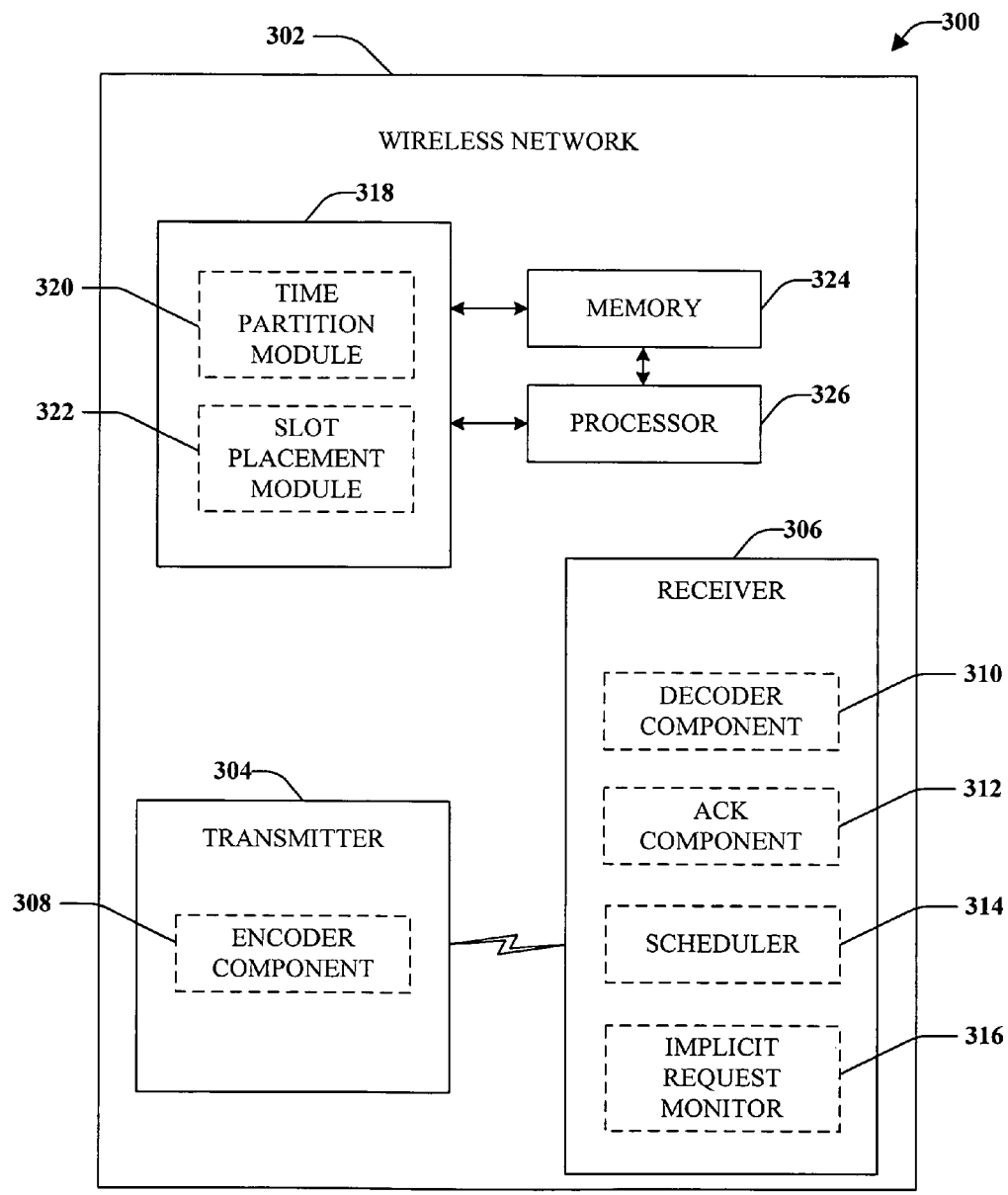
FIG. 3 illustrates another embodiment of a system for selectively partitioning control and data fields of a data transmission.

FIG. 3 illustrates an embodiment of a system 300 for selectively partitioning control and data fields of a data transmission. System 300 includes a wireless network 302, similar to the networks described in conjunction with the preceding figures. Network 302 is illustrated with a single transmitter 304 and a single receiver 306, however, a plurality of transmitters and receivers can be employed in system 300. Transmitter 304 includes an encoder component 308 that can encode outgoing signals according to a modulation scheme employed by network 302. Such signals can be received by receiver 306 and decoded by decoder component 310. An acknowledgment (ACK) component 312 can generate an acknowledgment indicative of successfully decoded data packets or layers transmitted in the signal and can return an acknowledgment to transmitter 304. ACK component 312 can generate a negative acknowledgment (NACK) if there was a problem in receiving the signal (e.g., a cyclic redundancy check does not match). Also included in receiver 306 is a scheduler 314 that can be configured to determine a proper scheduling of a data communication.

In some embodiments, an implicit request monitor 316, included in receiver 306 can be configured to monitor an ACK/NACK field from a sending node (e.g., transmitter 304) and treat the ACK/NACK field as an implicit request for resources Inplicit request monitor 316 can be configured to monitor or listen for an implicit request based on hearing an ACK sent by transmitter 304. If an ACK is detected, receiver 306 can consider to ACK as an implicit request for resources. An ACK sent by a node at a prior hop can be decoded by implicit request monitor 304 and the decoded ACK utilized as an implicit request for resources by the node at the prior hop. For example, there are three nodes (A, B, and C) and A wants to send data to C through B. First B should receive A's data properly and will send a positive ACK to A. C can hear this ACK and implicitly use it as a request for resources from B. Utilizing implicit request monitor 316 can mitigate the inclusion of an additional request field in the second portion of the control field.

Transmitter 304, receiver 306, or both may include, but are not limited to, communication interface components such as a serial port, a universal serial bus (USB), a parallel port, and wired and/or air interface components for implementing communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

One or more design module 318 can be included in network 302 and can include a time partition module and a slot placement module. Design module(s) 318 can include memory 324 operatively coupled to design module 318. Memory 324 can store information related to reducing latency in data transmissions while providing adequate processing time for scheduling, encoding, and decoding as well as other suitable information related to reducing latency in a communication network 302. A processor 326 can be operatively connected to design module 318 (and/or memory 324) to facilitate analysis of information related to reducing latency in a communication network 302. Processor 326 can be a processor dedicated to analyzing and/or generating information received by receiver 306, a processor that controls one or more components of system 300, and/or a processor that both analyzes and generates information received by design module 318 and controls one or more components of system 300.

Memory 324 can store protocols associated with placement of a control field or partitioning of a control field between receiver 306 and transmitter 304, etc., such that system 300 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 324 of the disclosed embodiments are intended to comprise, without being limited to, these and other suitable types of memory.

Figure 4:
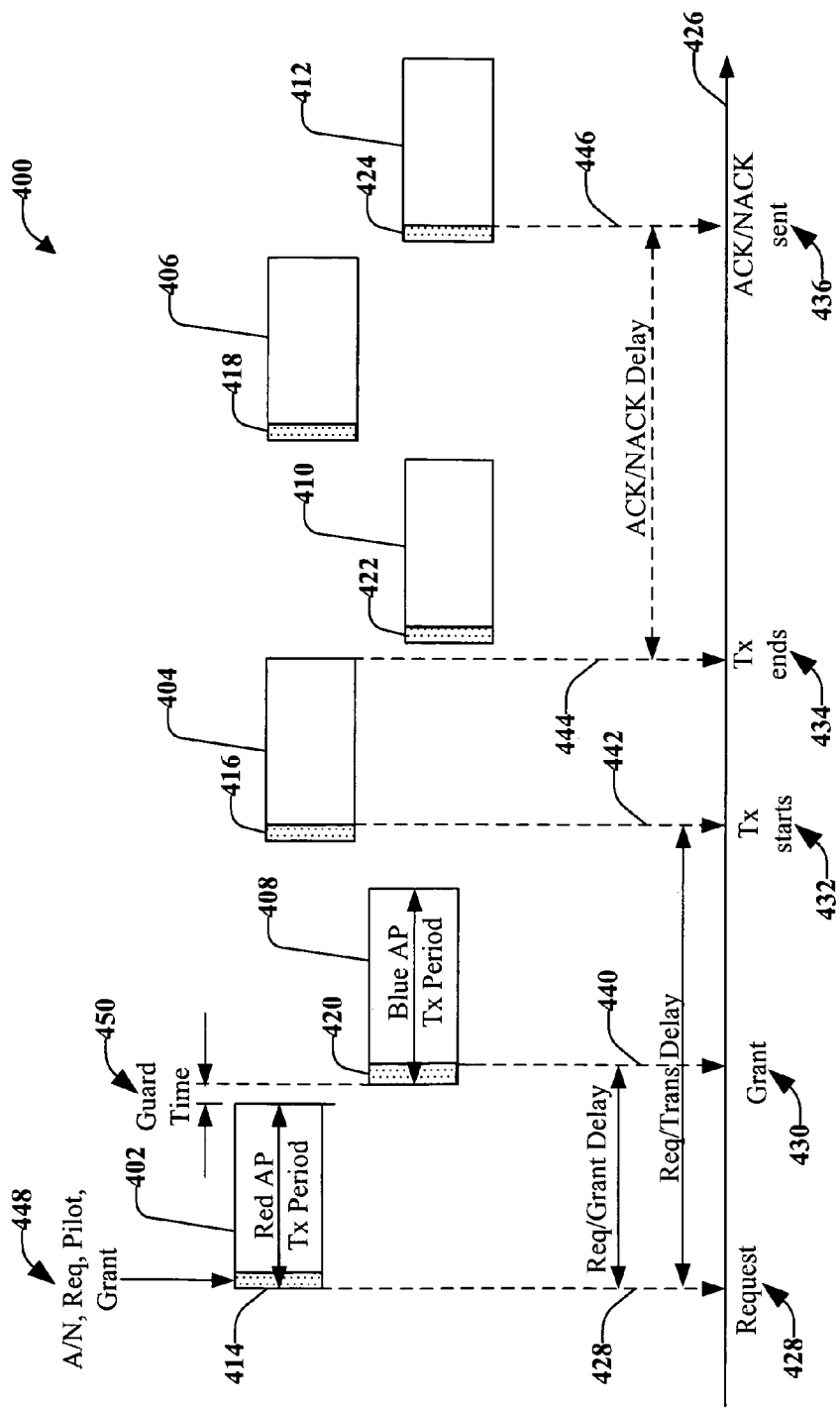
FIG. 4 illustrates a transmission and reception timeline.

With reference now to FIG. 4, a transmission and reception timeline 400 is being illustrated therein. Illustrated are three time slots representing access point (or terminal) transmit periods for an access point of a first color (e.g., red) labeled 402 (first red time slot), 404 (second red time slot), and 406 (third red time slot). Also illustrated are three time slots representing an access point (or terminal) transmit period for an access point of a second color (e.g., blue) labeled 408 (first blue time slot), 410 (second blue time slot), and 412 (third blue time slot). For purposes of explanation, the separate access points will be referred to as red and blue. However, it should be understood that another technique can be utilized to distinguish among the access points and color is utilized herein for purposes of simplicity. As illustrated, respective control fields 414-424 can be placed at a single location at the front of each time slot 402-412.

The relevant period of time can be represented as a horizontal line 426, wherein time moves from left to right. Periods of interest are indicated on the time line 426 as "REQUEST" 428; "GRANT" 430; Data Transmission Start, labeled as "TX STARTS" 432; Data Transmission End, labeled as "Tx ENDS" 434; and "ACK/NACK SENT" 436. Relevant delays are a Request/Grant Delay from 438 to 440, a Request/Transmit Delay from 438 to 442, and an ACK/NACK delay from 444 to 446.

During control portion 414 of first red slot 402, a request is sent 448. If there are other red nodes (not shown) that want to send data to the blue nodes, the other red nodes can send the data during the request or control period 414 of the first red time slot 402. For explanation purposes, it should be assumed that a receiver can distinguish and decode multiple requests at substantially the same time. The guard time is illustrated at 450.

Blue access points can consider the request(s) and decide how to grant the request(s). The GRANT message is carried in a control portion 420 of the first blue time slot 408. Red access points that received a GRANT transmit in the second red time slot 404. Since the decoding time would typically be longer than the guard time, the receiving blue Access Point will be able to ACK or NACK in the third blue time slot 412, but not during the second time slot 410. To keep the channel occupied, the use of two Hybrid ARQ interlaces can be utilized. For example, even red time slots can correspond to a first HARQ interlace (or process) and the odd red time slots can corresponding to a second HARQ interlace (or process).

The relevant delays can be a transmission delay, a retransmission delay, and a hop delay. The transmission delay is the minimum time between sending a request and starting to transmit data. The retransmission delay is the time between the end of the first transmission and the start of a retransmission. A retransmission may be appropriate if the original transmission is not decoded successfully at the receiver. The hop delay is the time between the end of data transmission on a hop to the start of transmission of the same data on the next hop.

Processing times that constrain the achievable delays (transmission, retransmission, and hop) are decoding time, encoding time, and scheduling time. Decoding time is the time between completing a data transmission and receiving an ACK or NACK. Decoding time represents the time available at the receiver to decode the transmission (e.g., to carry out convolutional, Turbo or LDPC based decoding). Encoding time is the time between receiving a GRANT and beginning to transmit data. Encoding time represents the time available to the transmitter to prepare the data in accordance with the GRANT (e.g., to carry out convolutional Turbo or LDPC encoding and/or HARQ sub-packet formation). Scheduling time is the time between receiving a request from one or more users and sending a GRANT in response to at least a subset of those requests. Scheduling time represents the time available at the receiver to process the requests, run the scheduling algorithm, and determine which users to GRANT and what resources.

As illustrated, a control field can be placed at a single location at the front of the slot. With the control field in this location, the transmission delay is approximately two slots, the retransmission delay is approximately three slots (assuming a NACK is accompanied by an autonomous grant, which is a grant that is made without necessarily getting a request). The hop delay is approximately two slots, assuming that a relay node can make a request for relaying onward a packet that it is in the process of receiving, but does not know if it will decode correctly or not (which is referred to herein as an anticipatory request). The corresponding processing times with the control field placed at the front of the slot are the decoding time takes approximately two slots, the encoding time takes approximately one slot, and the scheduling time is approximately one slot.

It should be noted that once the slot size is fixed or set, the delays are fixed and there is no further tradeoff of one delay with another. The slot size itself may be determined by a variety of other constraints such as physical layer packet sizes, latency requirements, channel dynamics, fairness, etc. Scheduling time of one slot might be appropriate, but encoding and decoding times may be over provisioned. Placing the control field at a single location at the front of the slot does not provide a way to reduce them, thereby decreasing the delay metrics.

Figure 5:
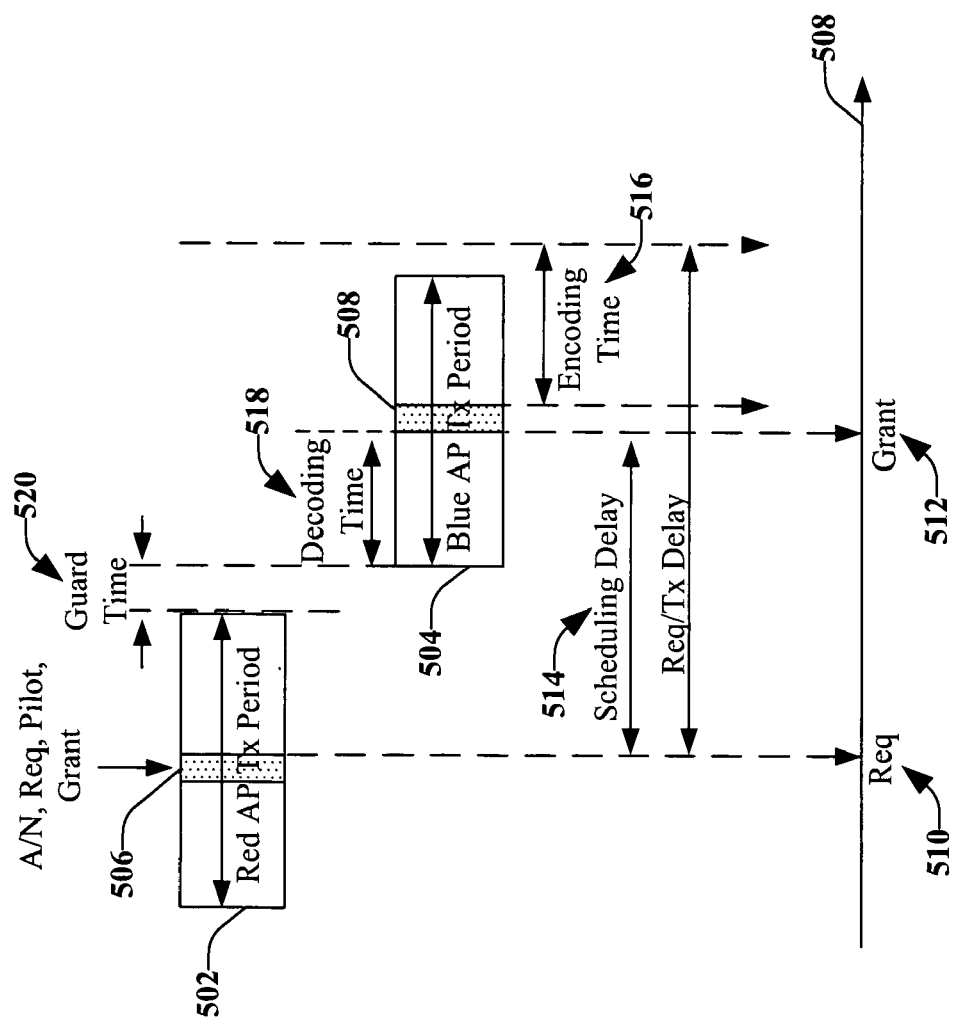
FIG. 5 illustrates placement of a control field in accordance with the one or more embodiments disclosed herein.

FIG. 5 illustrates placement of a control field in accordance with the one or more embodiments disclosed herein. Illustrated are a transmit period for a first access point (e.g., a red access point) 502 and a transmit period for a second access point (e.g., a blue access point) 504. Transmit periods 502 and 504 have respective control fields 506 and 508 that are placed away from either end of respective time slots 502 and 504. Although the control fields 506 and 508 are illustrated at the middle of respective time slots 502 and 504, it should be understood that the control fields 506 and 508 can be placed any place within the time slots 502 and 504. Placement in such a manner is referred to herein as a "single-location placement".

Single-location placement of the control field 508 can mitigate the need for anticipatory requests, which can lead to wasted resources in the event that the relay node fails to decode the packet correctly. Lower retransmission delay can also be achieved with single-location placement of the control field 506. Lower retransmission delay is one of the important considerations in a multi-hop context because the delay per hop may need to be small to meet overall latency requirements. A single HARQ interlace could be utilized when the control field is in a single-location placement. In addition, such a placement allows tradeoff of encoding time with decoding time as desired, and the sum of the times is about one slot.

It should be noted that utilizing a single-location placement of the control field can provide a scheduling time that is one slot and a decoding time of less then one slot. Although this can be appropriate in accordance with some embodiments, in other embodiments these times can be too short. In such embodiments, the slot duration can be increased to lengthen the timing of the scheduling time and/or decoding time.

A horizontal time line 508 is illustrated with timing of a "REQUEST" 510 and a corresponding "GRANT" 512. A scheduling time or scheduling delay 514 is approximately one slot regardless of the location of the control field 506, 508 within the slot. The sum of an encoding time 516 and a decoding time 518 is also approximately the time period of one slot. However, placement of control field 508 determines how that one slot time period is divided between encoding time 516 and decoding time 518. Typically, the decoding time 518 is longer than the encoding time 516 and, therefore, the control field 508 may be placed to the right of slot 504 center, allowing for a longer decoding time 518.

With the control field 508 placed to the right of center of the slot, the transmission delay can be more than one slot depending on where the control field 508 is placed relative to the start of the slot 504. The retransmission delay can be about one slot and the hop delay can be about two slots, however, anticipatory requests are not needed.

Figure 6:
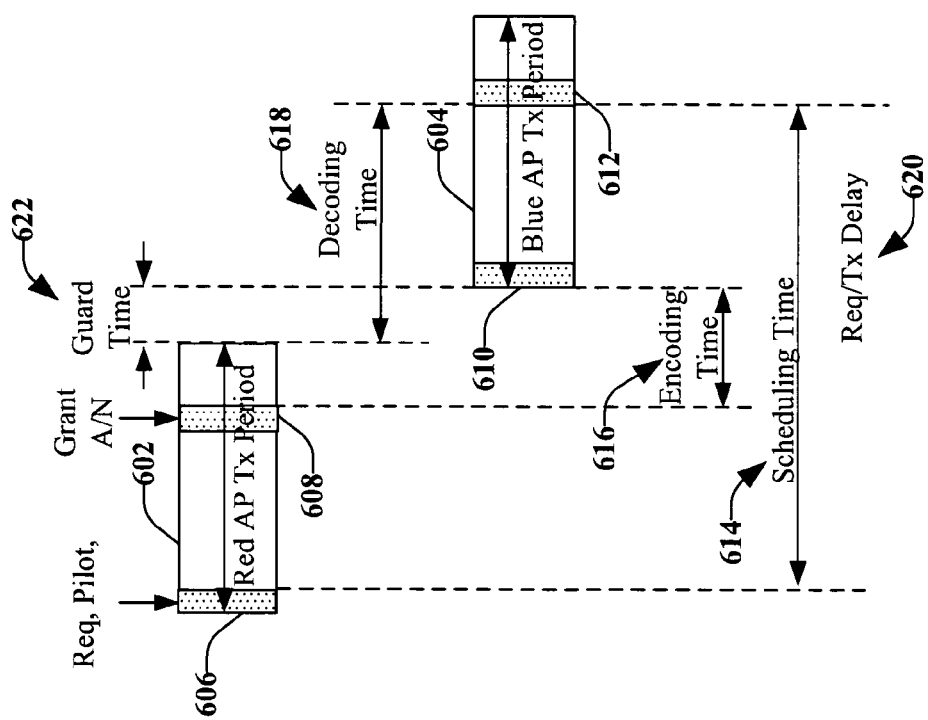
FIG. 6 illustrates a split placement of a control filed in accordance with the various embodiments.

With reference now to FIG. 6, illustrated is a split placement of a control field 600 in accordance with the various embodiments. A red access point transmit period having a control field 602 and a blue access point transmit period having a control field 604 are illustrated. Splitting the control fields 602, 604 into two parts can provide additional flexibility in the tradeoff between delay and processing time. Both single location/off-center placement and split placement allow a similar type of tradeoff between encoding time and encoding time. However, split placement can also allow for additional scheduling time. The first part 606, 610 of the control field 602, 604 can carry the "REQUEST" field and, optionally, a "PILOT", or other control information that is useful for the scheduling task (e.g., resources requested, quality of service (QoS) constraint, etc.). The second part of the control field 608, 612 can carry "GRANT", "ACK/NACK", and other information pertinent either to the assignment of resources or the decoding outcome.

Utilizing a split placement of a control field can provide a transmission delay of two slots, a retransmission delay of one slot, and a hop delay of two slots with an anticipatory request. The decoding time can be less than one slot and the encoding time can be less than one slot such that the sum of encoding and decoding times is one slot length. The scheduling time 614 can be designed to be between one and two slots depending on the separation between the control fields.

Similar to the single placement case, the split placement allows tradeoff of encoding time 616 and decoding time 618 while maintaining the sum of the times at one slot. However, split placement allows for much greater scheduling time without increasing the slot size. It should be noted that when utilizing the single-location placement the slot size should be increased in order to increase the available scheduling time. A Request to Transmit delay is shown at 620 and a guard time is shown at 622.

Split placement utilizes anticipatory requests while the single placement scheme does not utilize these requests. However, providing an additional request field as part of the second control field (the one containing the "GRANT" and "ACK/NACK") can mitigate the need for anticipatory requests. Depending on the typical HARQ mode of operation (e.g., HARQ retransmission attempt at which packets typically succeed and associated variability in retransmission attempt at success), this may be more desirable than having anticipatory requests.

In some embodiments, to mitigate anticipatory requests the receiving node on the next hop can listen for ACKs being sent out, with the ACKS being an implicit request for resources. For example, data is to be sent from Node A to Node B to Node C. Node B might request resources to send to Node C if Node B has successfully decoded the transmission from Node A. If, however, Node C listens for ACKs that Node B sends to Node A, then Node C can implicitly use the ACK from Node B to Node A to infer a request for resources by Node B.

Figure 7:
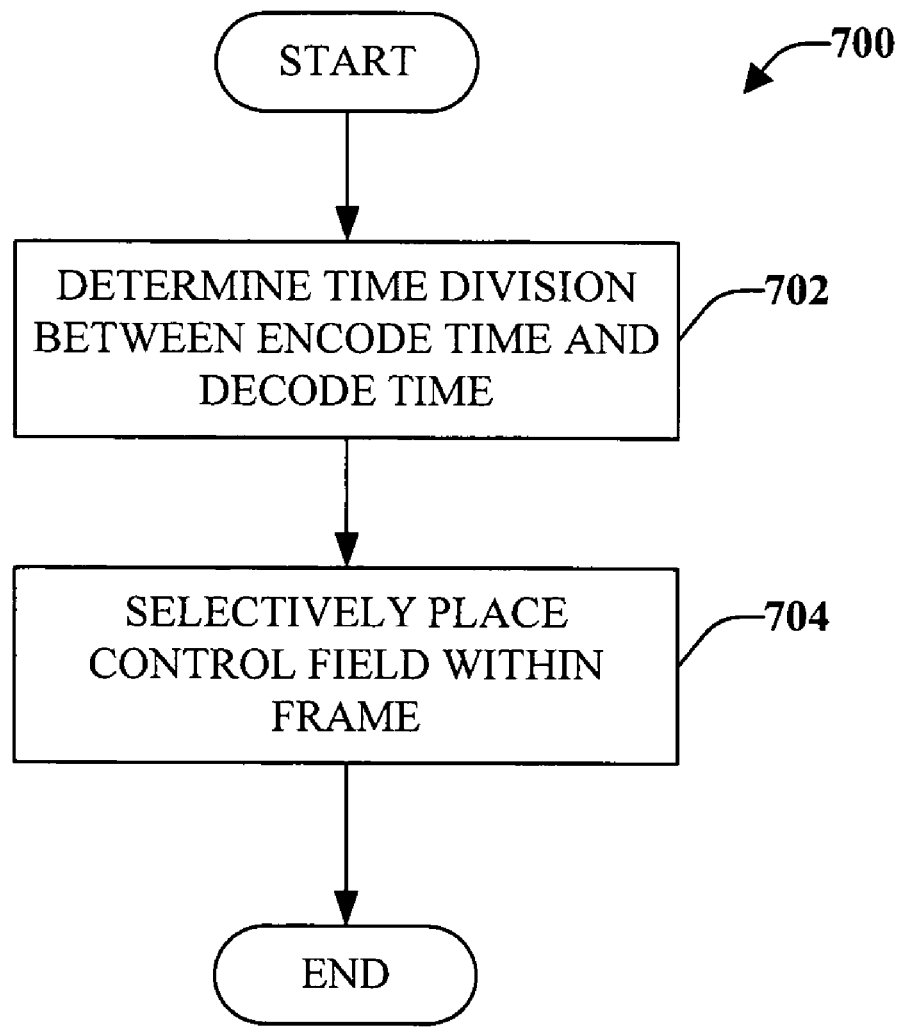
FIG. 7 illustrates a flow diagram of a methodology for selectively partitioning data and control fields.
Figure 8:
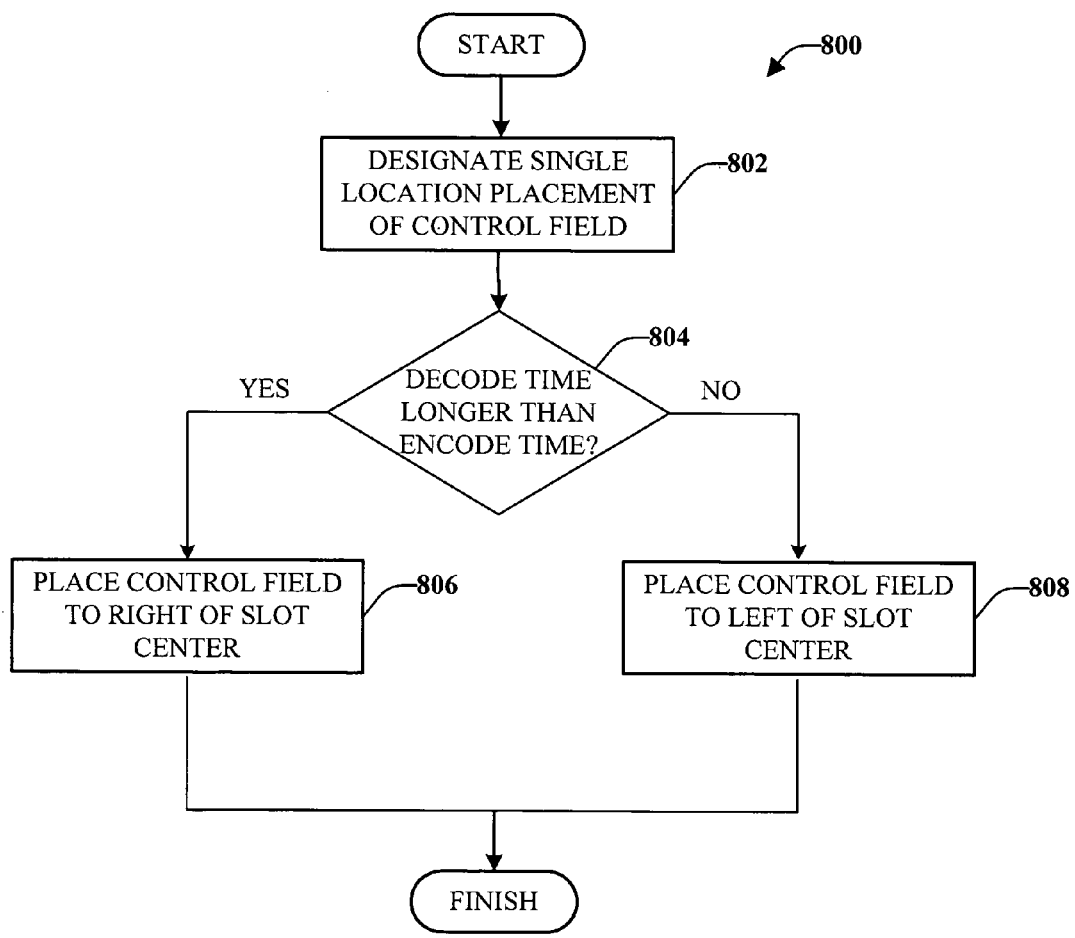
FIG. 8 illustrates a flow diagram of a methodology for selectively positioning a control filed in a single location placement.
Figure 9:
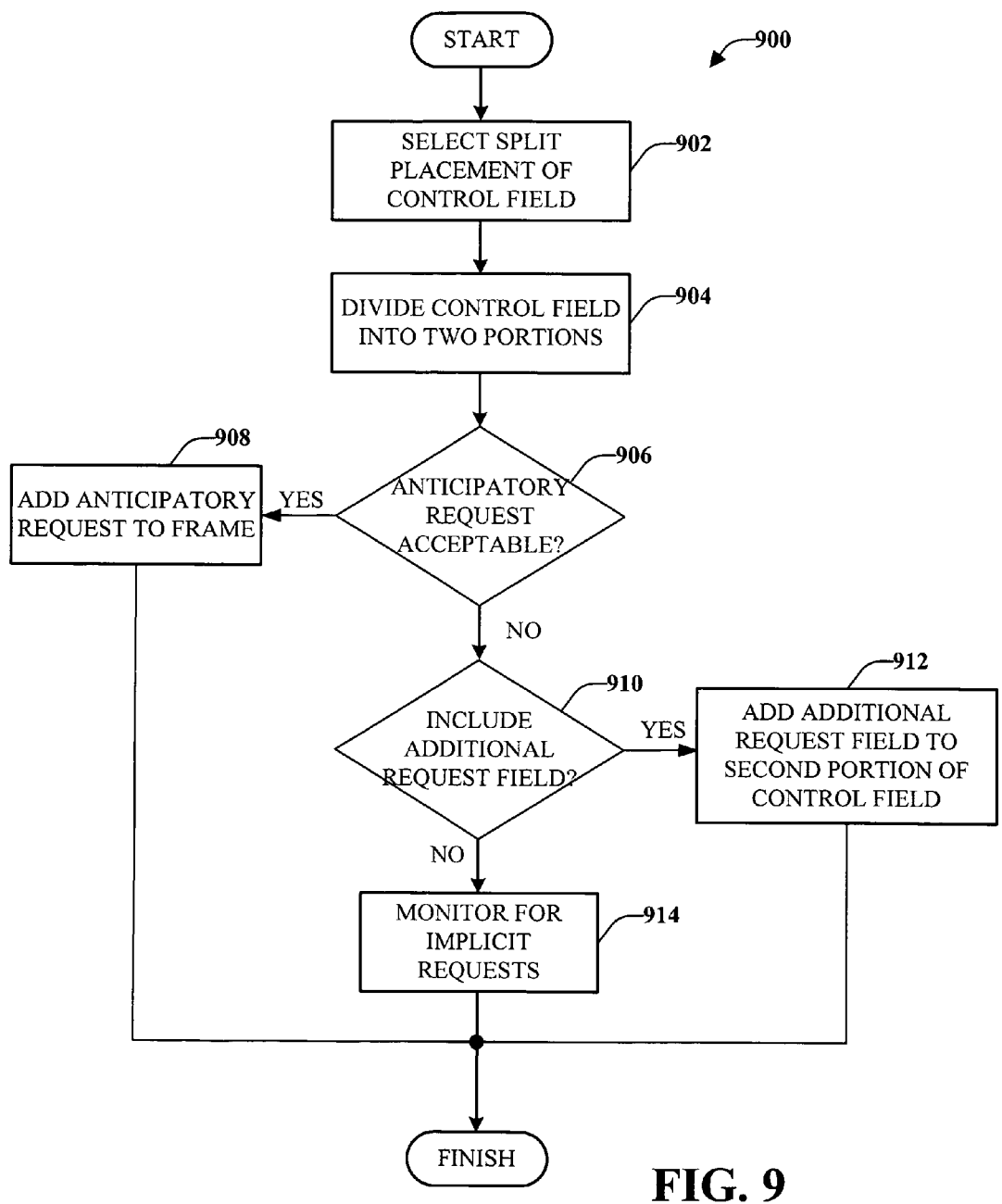
FIG. 9 illustrates a flow diagram of a design methodology for utilizing a split placement control field for a data communication.

In view of the exemplary systems shown and described above, methodologies, which may be implemented in accordance with one or more aspects of the various embodiments, will be better appreciated with reference to the diagrams of FIGS. 7-9. While, for purposes of simplicity of explanation, the methodologies are shown and described as a series of blocks, it is to be understood and appreciated that the methodologies are not limited by the order of blocks, as some blocks may, in accordance with these methodologies, occur in different orders and/or concurrently with other blocks from that shown and described herein. Moreover, not all illustrated blocks may be required to implement a methodology in accordance with one or more aspects of the disclosed embodiments. It is to be appreciated that the various blocks may be implemented by software, hardware, a combination thereof or any other suitable means (e.g. device, system, process, component) for carrying out the functionality associated with the blocks. It is also to be appreciated that the blocks are merely to illustrate certain aspects presented herein in a simplified form and that these aspects may be illustrated by a lesser and/or greater number of blocks. Those skilled in the art will understand and appreciate that a methodology could alternatively be represented as a series of interrelated states or events, such as in a state diagram.

FIG. 7 illustrates a flow diagram of a methodology 700 for selectively partitioning data and control fields. At 702, a time division between an encoding time and a decoding time is determined. Based in part on the determined time division, a control field is selectively placed within the frame, at 704. Such selective placement can include the entire control field placed at the beginning of the slot. In this scenario the slot size and delays are fixed and tradeoff of one delay with another is not possible. There may be over provisioning of encoding and decoding times, which may not be reduced, thereby decreasing the delay metrics.

Another selective placement can include placing the control field at a single location within the slot. This placement allows tradeoff of encoding time with decoding time, provided the sum of both times is one slot. It should be noted that the scheduling time is one slot and decoding time of less than one slot may be too short in some cases and to lengthen the decoding time, the slot duration should be lengthened.

Splitting the control field into two portions and placing each portion at different locations within the slot is another type of selective placement. Splitting the control field provides flexibility in the tradeoff between encoding time and decoding time, while maintaining their sum to be one slot. This type of placement additionally provides longer scheduling time without increasing the slot size. A two-portion control field can include an anticipatory request, however, placing an additional request field in the second portion mitigates the need for the anticipatory request. Alternatively or in addition, monitoring for an implicit request can be utilized to mitigate the need for the anticipatory request and/or the additional request field.

FIG. 8 illustrates a flow diagram of a methodology 800 for selectively positioning a control filed in a single location placement. At 802, a single location placement of a control field within a slot is designated. This designation can be made based on a trade off between latency and processing time. Such a placement can reduce the number of anticipatory requests and/or the retransmission delay can be shortened. In addition, with such a placement a single HARQ is utilized.

At 804, a determination is made whether the decoding time should be longer than an encoding time. If the decoding time should be longer than the encoding time ("YES"), at 806, the control field is placed to the right of the center of the slot. If the encoding time should be longer than the decoding time ("NO"), at 808, the control field is placed to the left of the center of the slot. It should be noted that the tradeoff between an encoding time and a decoding time should be about the length of one slot when the control field is placed in a single placement location.

FIG. 9 illustrates a flow diagram of a design methodology 900 for utilizing a split placement control field for a data communication. A split placement of a control field is selected, at 902. This selection can be made based upon various criteria including a tradeoff between latency and processing time in a data transmission. The tradeoff can be optimized to reduce latency while providing sufficient processing time. At 904, the control field is divided into two portions. The first portion can carry a "REQUEST" field and optionally a "PILOT" or other control information that can be utilized for a scheduling task (e.g., resources requested, QoS, constraint, and the like). The second portion of the control field can carry a "GRANT", "ACK/NACK" and other information pertinent either to an assignment of resources or a decoding outcome.

At 906, a determination is made whether an anticipatory request is acceptable. The acceptability of the anticipatory request may be based on a probability of successfully decoding a packet at a relay node. If the probability of successfully decoding a packet at the relay node is high, then the anticipatory request is acceptable. Otherwise, the anticipatory request is not acceptable. Anticipatory requests might waste resources in the situation where a relay node does not decode the packet successfully. If including an anticipatory request is acceptable ("YES"), the method 900 continues at 908 and an anticipatory request is added to the frame by the transmitting node. If the determination, at 906, is that an anticipatory request is not acceptable ("NO"), at 910, a determination is made whether an additional request field should be included in a second portion of the control field. The determination of whether to include an additional request field may be based on whether the frame is being transmitted in HARQ mode. If the frame is being transmitted in HARQ mode, then the additional request field is included in the second portion of the control field. Otherwise, the additional request field is not included. If the second portion of the control field can include an additional request field ("YES"), the field is added, at 912, by the transmitting node. If the additional request field should not be included ("NO"), the method 910 continues, at 914, where an implicit request is monitored, by the receiving node.

If an anticipatory request or additional request field is to be included, the transmitter node includes such request. If an anticipatory request or additional request field is not included, monitoring of the implicit request can be performed at the receiver node. In some embodiments, monitoring for an implicit request, at 914, can include a receiving node on a next hop listening or monitoring for ACKs (e.g., implicit request for resources) being sent out. This ACK can be decoded and used as the implicit request for resources.

For example, there are three nodes (Node A, Node B, and Node C). Data is to be sent from Node A to Node B to Node C. Node A sends a request to Node B in a first time slot. In a next time slot, Node B grants the request. Generally, Node B should first decode such packet before the packet is sent to Node C because, if Node B does not successfully decode the packet, the packet cannot be sent to Node C. However, since Node B transmits every other time slot, in some embodiments Node B might send a request to Node C during the time slot in which it is sending the grant to Node A (referred to herein as an anticipatory request). Such a situation can occur when there is a high probability that Node B will successfully decode the packet received from Node A. Sending an anticipatory request to Node C at substantially the same time as a grant is sent to Node A reduces latency between Node A and Node C. If an additional request field is included, Node B decodes the packet and sends an ACK to Node A during the same time slot in which Node B sends a request to Node C.

Both anticipatory request and the additional request are performed by Node B (transmitter) in the example provided. Thus, Node C (receiver) does not need to search for an implicit ACK. If however, the additional request or anticipatory request are not provided, Node C can monitor the ACK sent by Node B to Node A and send an implicit request for data upon detecting the ACK.

Figure 10:
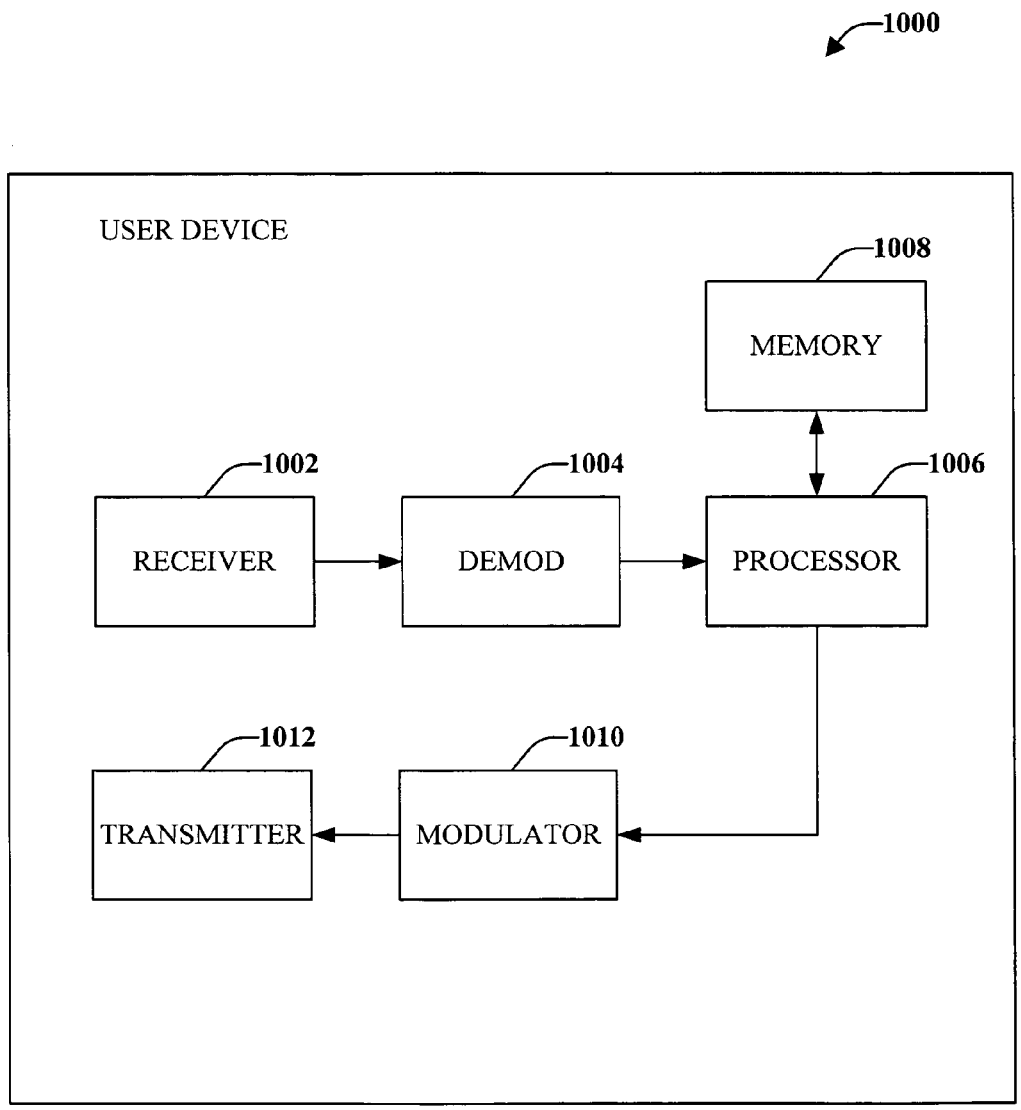
FIG. 10 illustrates a system that coordinates communication between multiple communication protocols in a wireless communication environment in accordance with one or more embodiments presented herein.

With reference now to FIG. 10, illustrated is a system 1000 that facilitates coordinated communication between multiple communication protocols in a wireless communication environment in accordance with one or more of the disclosed embodiments. System 1000 can reside in an access point and/or in a user device. System 1000 comprises a receiver 1002 that can receive a signal from, for example, a receiver antenna. The receiver 1002 can perform typical actions thereon, such as filtering, amplifying, downconverting, etc. the received signal. The receiver 1002 can also digitize the conditioned signal to obtain samples. A demodulator 1004 can obtain received symbols for each symbol period, as well as provide received symbols to a processor 1006.

Processor 1006 can be a processor dedicated to analyzing information received by receiver component 1002 and/or generating information for transmission by a transmitter 1016. Processor 1006 can control one or more components of user device 1000, and/or processor 1006 can analyze information received by receiver 1002, generate information for transmission by transmitter 1016 and control one or more components of user device 1000. Processor 1006 may include a controller component capable of coordinating communications with additional user devices.

User device 1000 can additionally comprise memory 1008 that is operatively coupled to processor 1006 and that stores information related to coordinating communications and any other suitable information. Memory 1008 can additionally store protocols associated with coordinating communication. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and/or methods is intended to comprise, without being limited to, these and any other suitable types of memory. User device 1000 still further comprises a symbol modulator 1010 and a transmitter 1012 that transmits the modulated signal.

Figure 11:
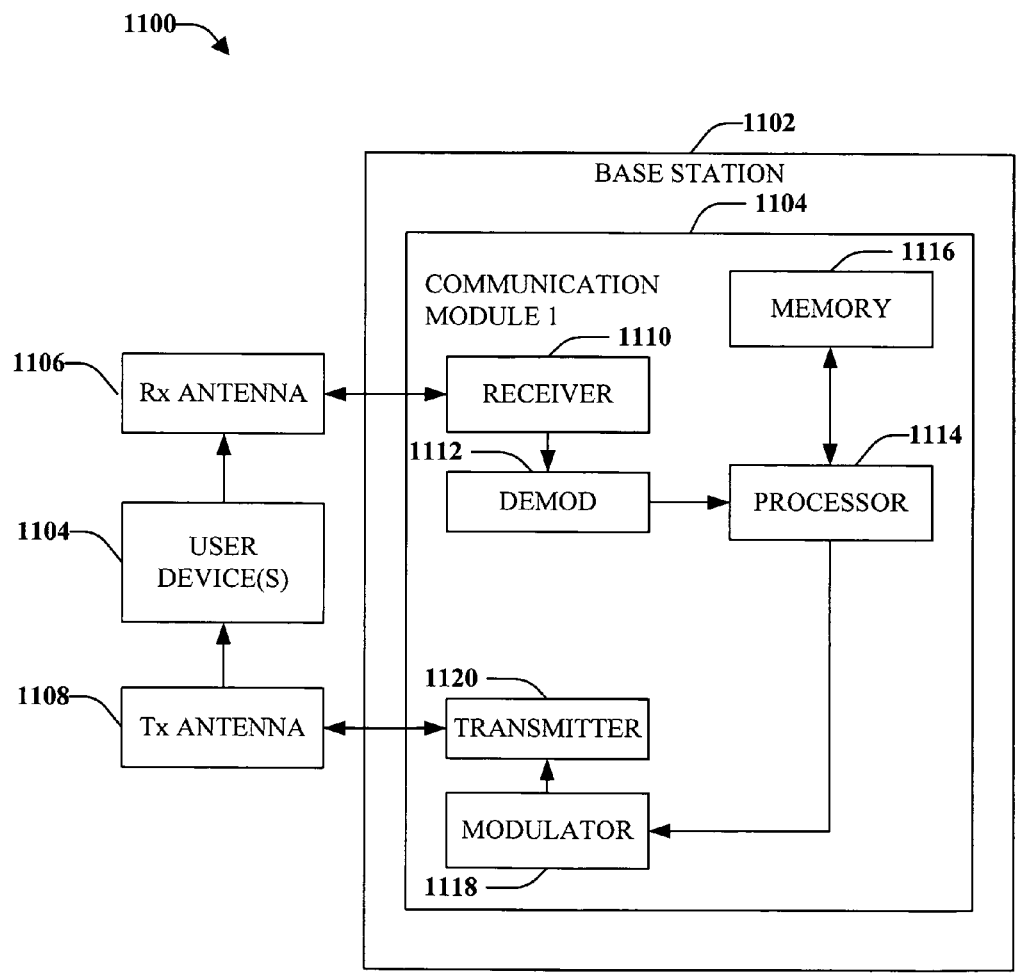
FIG. 11 illustrates a system that coordinates communication in wireless communication environment in accordance with various aspects.

FIG. 11 is an illustration of a system 1100 that facilitates coordination of communication protocols in accordance with various aspects. System 1100 comprises a base station or access point 1102. As illustrated, base station 1102 receives signal(s) from one or more user devices 1104 by a receive antenna 1106, and transmits to the one or more user devices 1104 through a transmit antenna 1108.

Base station 1102 comprises a receiver 1110 that receives information from receive antenna 1106 and is operatively associated with a demodulator 1112 that demodulates received information. Demodulated symbols are analyzed by a processor 1114 that is coupled to a memory 1116 that stores information related to code clusters, user device assignments, lookup tables related thereto, unique scrambling sequences, and the like. A modulator 1118 can multiplex the signal for transmission by a transmitter 1120 through transmit antenna 1108 to user devices 1104.

Figure 12:
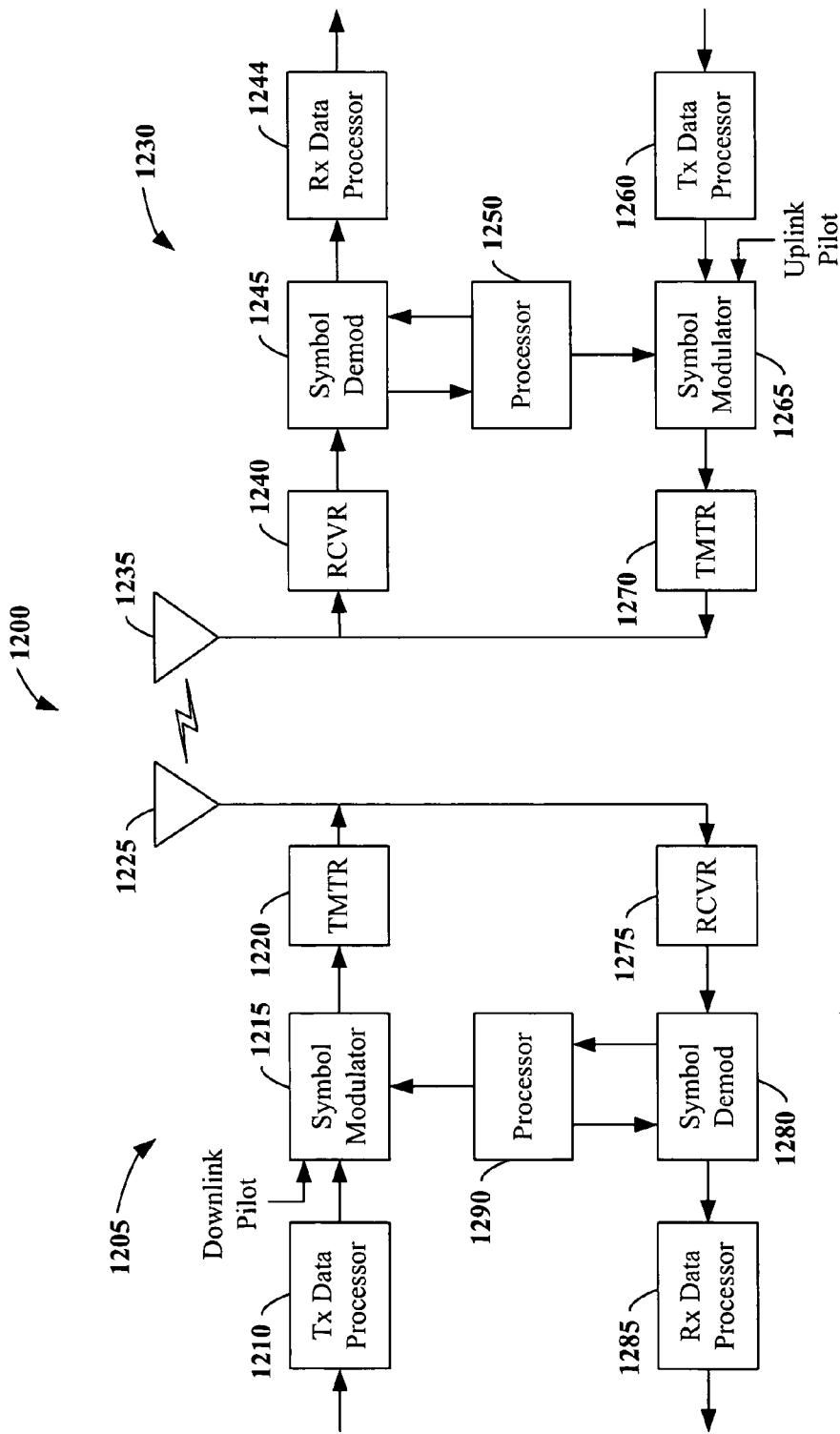
FIG. 12 illustrates a wireless communication environment that can be employed in conjunction with the various systems and methods described herein.

FIG. 12 illustrates an exemplary wireless communication system 1200. Wireless communication system 1200 depicts one base station and one terminal for sake of brevity. However, it is to be appreciated that system 1200 can include more than one base station or access point and/or more than one terminal or user device, wherein additional base stations and/or terminals can be substantially similar or different for the exemplary base station and terminal described below. In addition, it is to be appreciated that the base station and/or the terminal can employ the systems and/or methods described herein to facilitate wireless communication there between.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. A symbol modulator 1215 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 obtains N received symbols and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (e.g., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from terminal 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by terminal 1230. A processor 1290 performs channel estimation for each active terminal transmitting on the uplink.

Processors 1290 and 1250 direct (e.g., control, coordinate, manage, etc.) operation at access point 1205 and terminal 1230, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

Figure 13:
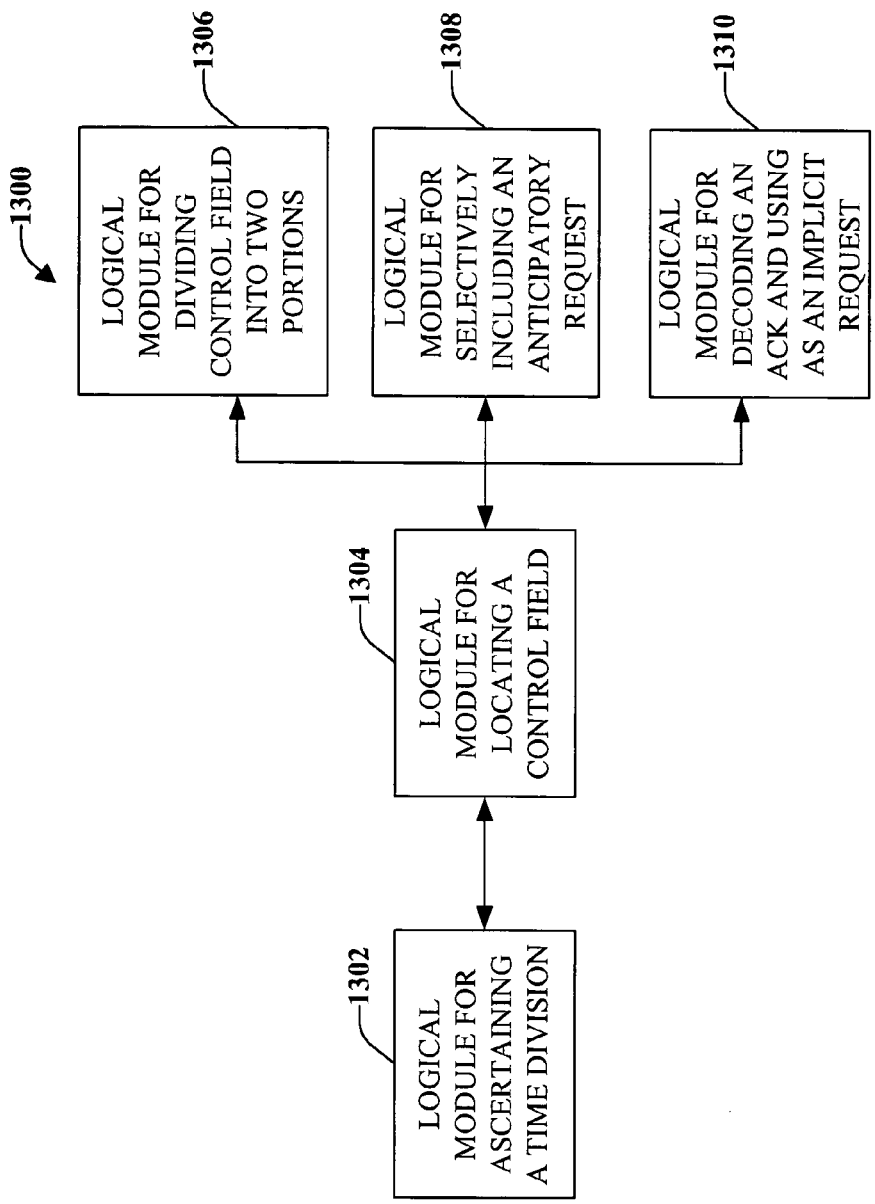
FIG. 13 illustrates a system for selectively partitioning control and data fields of a data transmission in a multi-hop wireless communication network.

FIG. 13 illustrates a system 1300 for selectively partitioning control and data fields of a data transmission in a multi-hop wireless communication network. System 1300 is represented as functional blocks, which can be functional blocks that represent functions implemented by a processor, software or combination thereof (e.g., firmware) and can be included in a wireless apparatus or other device.

System 1300 includes a logical module 1302 for ascertaining an encoding time and a decoding time division. A logical module 1304 for locating a control field within a frame can make a location determination based in part on the ascertained division between the encoding time and the decoding time. The location of the control field can be at the front of the slot, in the center of the slot, offset (left or right) from the center of the slot, or the control field can be divided and placed in two locations within the slot.

Also included in system 1300 can be one or more logical modules 1306 for dividing the control field into two portions. Dividing the control field into two portions can provide better latency performance while providing adequate processing time for scheduling, encoding, and decoding. A logical module 1308 for selectively including an anticipatory request can also be included. An anticipatory request might not be included if a request field is included in the second portion of a divided or split control field. System 1300 can also include a logical module 1310 for decoding an ACK and using the ACK as an implicit request for resources.

For example, a wireless apparatus can comprise a means for ascertaining an encoding time and a decoding time division, which can be logical module 1302, and a means for locating a control field within a frame based in part on the ascertained division between the encoding time and the decoding time, which can be logical module 1304. In some embodiments, a wireless apparatus can also include a means for dividing the control field into two portions, which can be logical module 1306. Also included can be a means for selectively including an anticipatory request, which can be logical module 1308, and a means for decoding an ACK and using the ACK as an implicit request for resources, which can be logical module 1310.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for data communication, comprising:
   determining a time division between an encoding time and a decoding time by an apparatus; and
   selectively placing a control field within a flame of a data transmission based in part on the determined time division by the apparatus.

2. The method of claim 1, selectively placing a control field further comprising:
   placing the control field right of a slot center if the decoding time is longer than the encoding time or placing the control field left of the slot center if the decoding time is shorter than the encoding time.

3. The method of claim 1, selectively placing a control field further comprising:
   splitting the control field into at least two portions; and
   providing a request field as part of one of the at least two portions of the control field.

4. The method of claim 1, further comprising:
   dividing the control field into a first portion and a second portion;
   placing in the first portion of the control field at least one of a REQUEST, a PILOT, and a control information; and
   placing in a second portion of the control field at least one of a GRANT, an ACK/NACK, and information relating to assignment of resources or decoding outcome.

5. The method of claim 4, further comprising:
   placing the first portion of the control field at a start of the frame; and
   placing the second portion of the control field at a location within the frame based in part on the determined time division.

6. The method of claim 1, further comprising:
   decoding an acknowledgment sent by a node at a prior hop; and
   using the decoded acknowledgment as an implicit request for resources.

7. The method of claim 1, wherein the control field comprises a request field, a grant field, and an acknowledgment/negative acknowledgment field.

8. The method of claim 1, further comprising:
   determining whether to place an anticipatory request in the frame based on a probability of a relay node to successfully decode a packet; and
   placing the anticipatory request in the frame by a transmitting node based on the anticipatory request determination.

9. The method of claim 8, if the determination indicates the anticipatory request should not be placed in the frame, the method further comprising:
   determining whether to place an additional request field in the second portion of the control field based on whether the frame is being transmitted in HARQ mode; and including the additional request field by the transmitting node based on the additional request field determination.

10. The method of claim 9, if the determination indicates the additional request field should not be placed in the second portion of the control field, the method further comprising monitoring an implicit request by a receiving node.

11. The method of claim 1, wherein placing the control field within the frame is based in part on a scheduling time.

12. The method of claim 1, wherein placing the control field within the frame is based in part on a hop delay time.

13. The method of claim 1, further comprising communicating the placement of the control field within the frame to an access point or access terminal.

14. An apparatus for data communication, comprising:
a time partition module that determines a time partition between an encoding time and a decoding time; and
a slot placement module that determines placement of the control field within a frame of a data transmission based in part on the determined time partition.

15. The apparatus of claim 14, wherein the slot placement module places the single control field right of a slot center if the decoding time is longer than the encoding time or left of the slot center if the decoding time is shorter than the encoding time.

16. The apparatus of claim 14, wherein the time partition module splits the control field into two portions and locates a request field in one of the two portions.

17. The apparatus of claim 16, wherein the time partition module places a REQUEST and a PILOT in a first portion of the divided control field and places a GRANT and an ACK/NACK in a second portion of the divided control field.

18. The apparatus of claim 14, wherein the control field comprises a request field, a grant field, and an acknowledgment/negative acknowledgment field.

19. A computer readable non-transitory medium having stored thereon computer-executable instructions for data communication, the instructions being configured to:
determine a time division between an encoding time and a decoding time; and
selectively place a control field within a frame of a data transmission based in part on the determined time division.

20. The computer readable non-transitory medium of claim 19, the instructions further being configured to:
place the control field right of a slot center if the decoding time is longer than the encoding time or placing the control field left of the slot center if the decoding time is shorter than the encoding time.

21. An apparatus for data communication comprising:
means for determining a time division between an encoding time and a decoding time; and
means for selectively placing a control field within a frame of data transmission on based in part on the determined time division.

* * * * *